(12) United States Patent
Jolic

(10) Patent No.: US 9,873,282 B2
(45) Date of Patent: Jan. 23, 2018

(54) OPTICALLY VARIABLE DEVICE

(75) Inventor: Karlo Ivan Jolic, West Footscray (AU)

(73) Assignee: CCL Secure Pty Ltd, Craigieburn, Victoria (AU)

( * ) Notice: Subject to any disclaimer, the term of this patent is extended or adjusted under 35 U.S.C. 154(b) by 101 days.

(21) Appl. No.: 13/819,552

(22) PCT Filed: Aug. 26, 2011

(86) PCT No.: PCT/AU2011/001095
§ 371 (c)(1),
(2), (4) Date: Feb. 27, 2013

(87) PCT Pub. No.: WO2012/027779
PCT Pub. Date: Mar. 8, 2012

(65) Prior Publication Data
US 2013/0154251 A1 Jun. 20, 2013

(30) Foreign Application Priority Data
Sep. 3, 2010 (AU) .................. 2010903953

(51) Int. Cl.
*B42D 25/00* (2014.01)
*B42D 25/425* (2014.01)
(Continued)

(52) U.S. Cl.
CPC .......... *B42D 25/425* (2014.10); *B41M 3/148* (2013.01); *B42D 15/00* (2013.01); *B42D 25/00* (2014.10); *B42D 25/29* (2014.10); *B42D 25/328* (2014.10); *G02B 3/005* (2013.01); *G02B 3/0006* (2013.01); *G02B 5/1809* (2013.01); *G02B 5/32* (2013.01);
(Continued)

(58) Field of Classification Search
CPC .......................... B42D 15/0013; B41M 3/148
See application file for complete search history.

(56) References Cited

U.S. PATENT DOCUMENTS 5,712,731 A * 1/1998 Drinkwater .......... G02B 5/1885
359/619
6,177,953 B1 1/2001 Vachette et al.
(Continued)

FOREIGN PATENT DOCUMENTS

GB      2481330 A    12/2011
GB      2495686 A    4/2013
(Continued)

OTHER PUBLICATIONS

Hak Translation (Oct. 2009).*
(Continued)

*Primary Examiner* — Kyle Grabowski
(74) *Attorney, Agent, or Firm* — Christopher M. Scherer; DeWitt Ross & Stevens S.C.

(57) ABSTRACT

A security element, security device and method of forming a security device wherein the security element includes focusing elements, a first group of image elements, and a second group of image elements, each image element being located in an object plane to be viewable through a focusing element, and being located a distance from the focusing element such that the focal point width of the focusing element in the object plane is substantially equal to the size of the image element or differs from the size of the image element by a predetermined amount.

22 Claims, 5 Drawing Sheets

(51) Int. Cl.
    B42D 25/328    (2014.01)
    B41M 3/14      (2006.01)
    G02B 3/00      (2006.01)
    G02B 5/18      (2006.01)
    G02B 5/32      (2006.01)
    B42D 15/00     (2006.01)
    B42D 25/29     (2014.01)
(52) U.S. Cl.
    CPC ...... *B42D 2035/02* (2013.01); *B42D 2035/26* (2013.01)

(56) References Cited

U.S. PATENT DOCUMENTS

| | | | |
|---|---|---|---|
| 6,256,149 B1 | 7/2001 | Rolfe | |
| 2008/0036196 A1* | 2/2008 | Steenblik et al. | ............ 283/109 |
| 2009/0102605 A1* | 4/2009 | Kaule | ................... B42D 25/00 340/5.86 |
| 2010/0194094 A1* | 8/2010 | Kiuchi | ................... B42D 25/29 283/113 |
| 2012/0033305 A1* | 2/2012 | Moon | ................... B42D 25/29 359/619 |

FOREIGN PATENT DOCUMENTS

| | | | | |
|---|---|---|---|---|
| GB | 2515209 A | | 12/2014 | |
| KR | 100980360 | * | 10/2009 | |
| WO | WO 2009031570 A1 | * | 3/2009 | ............. B42D 25/29 |
| WO | WO 2009070510 A2 | * | 6/2009 | ......... G02B 27/2214 |
| WO | 2010099571 A1 | | 9/2010 | |

OTHER PUBLICATIONS

Search Report for International Patent Application No. PCT/AU2011/001095; dated Oct. 12, 2011.
UK Examination Report for Corresponding UK Application GB1303509.2; dated Feb. 22, 2016.

* cited by examiner

OPTICALLY VARIABLE DEVICE

PRIORITY CLAIM

This patent application is a U.S. National Phase of International Patent Application No. PCT/AU2011/001095, filed 26 Aug. 2011, which claims priority to Australian Patent Application No. 2010903953, filed 3 Sep. 2010, the disclosures of which are incorporated herein by reference in their entirety.

FIELD

Disclosed embodiments relate to optically variable devices for security and decorative purposes, and methods of their manufacture.

BACKGROUND

It is known to provide optically variable devices in which arrays of lenticular (part-cylindrical lenses) focus on an object plane containing multiple sets of interleaved image elements. Each set of image elements (strips) belongs to a distinct image, so that as the person viewing the device changes the angle of view, a different image becomes visible.

In security applications, and in particular when dealing with flexible security documents such as banknotes, it is desirable to minimise the thickness of a lens array applied to the security document. For example, a thickness for polymer banknote substrates currently in use is approximately 90 microns, including the thickness of the lens array. In order to meet this design constraint, lenses of diameter approximately 50 microns or less are used.

The effect produced by optically variable devices containing multiple sets of interleaved image elements as described above is sometimes known as a "flipping image" effect. The number of distinct images in the flipping image effect is limited by the number of sets of image elements that can be placed in the field of view of a lens in the lens array. For example, if a two-channel flipping image is to be produced, then two sets of image elements are required. This means that each image element can have a width no greater than half the width of a lens.

If lenses of width 50 microns are used, the image elements should be no greater than 25 microns wide in order to ensure that there is minimal cross-talk between the channels of the flipping image. An image element width of 25 microns or less is achievable with some techniques used in security printing. However, other commonly used techniques, such as gravure (sometimes known as rotogravure) printing cannot consistently apply image elements having this width. A minimum practical width of line elements currently achievable with gravure printing is approximately 35-45 microns. Image elements of this width produce unacceptably large amounts of cross-talk when used with 50 micron diameter lenses.

It has previously been found that a given substrate thickness can be maintained, while increasing the diameter of the lenses in the lenticular array, by adjusting the lens parameters such that the focal point width of the lenses in the object plane is approximately the same as the width of the image elements, as described in our PCT application PCT/AU2010/000243, incorporated herein by reference in its entirety. For example, for a substrate thickness of 90 microns, lenses of diameter 63.5 microns can be used.

However, even with lenses of this increased diameter, a flipping image device with two channels still produces unacceptable cross-talk because the minimum practically achievable width of gravure line elements is 35-45 microns, which is still more than half the lens diameter.

There is, therefore, a need for an optically variable device which can produce flipping image effects, and which can be produced using a wider variety of security printing techniques, while being less susceptible to cross-talk.

Definitions

Focal Point Size H

As used herein, the term focal point size refers to the dimensions, usually an effective diameter or width, of the geometrical distribution of points at which rays refracted through a lens intersect with an object plane at a particular viewing angle. The focal point size may be inferred from theoretical calculations, ray tracing simulations, or from actual measurements.

Focal Length f

In the present specification, focal length, when used in reference to a microlens in a lens array, means the distance from the vertex of the microlens to the position of the focus given by locating the maximum of the power density distribution when collimated radiation is incident from the lens side of the array (see T. Miyashita, "Standardization for microlenses and microlens arrays" (2007) *Japanese Journal of Applied Physics* 46, p 5391).

Gauge Thickness t

The gauge thickness is the distance from the apex of a lenslet on one side of the transparent or translucent material to the surface on the opposite side of the translucent material on which the image elements are provided which substantially coincides with the object plane.

Lens Frequency and Pitch

The lens frequency of a lens array is the number of lenslets in a given distance across the surface of the lens array. The pitch is the distance from the apex of one lenslet to the apex of the adjacent lenslet. In a uniform lens array, the pitch has an inverse relationship to the lens frequency.

Lens Width W

The width of a lenslet in a microlens array is the distance from one edge of the lenslet to the opposite edge of the lenslet. In a lens array with hemispherical or semi-cylindrical lenslets, the width will be equal to the diameter of the lenslets.

Radius of Curvature R

The radius of curvature of a lenslet is the distance from a point on the surface of the lens to a point at which the normal to the lens surface intersects a line extending perpendicularly through the apex of the lenslet (the lens axis).

Sag Height s

The sag height or surface sag s of a lenslet is the distance from the apex to a point on the axis intersected by the shortest line from the edge of a lenslet extending perpendicularly through the axis.

Refractive Index n

The refractive index of a medium n is the ratio of the speed of light in vacuo to the speed of light in the medium. The refractive index n of a lens determines the amount by which light rays reaching the lens surface will be refracted, according to Snell's law:

$$n_1 * \mathrm{Sin}(\alpha) = n * \mathrm{Sin}(\theta),$$

where $\alpha$ is the angle between an incident ray and the normal at the point of incidence at the lens surface $\theta$ is the angle between the refracted ray and the normal at the point of incidence, and $n_1$ is the refractive index of air (as an approximation $n_1$ may be taken to be 1).

Conic Constant P

The conic constant P is a quantity describing conic sections, and is used in geometric optics to specify spherical (P=1), elliptical (0<P<1, or P>1), parabolic (P=0), and hyperbolic (P<0) lens. Some references use the letter K to represent the conic constant. K is related to P via K=P−1.

Lobe Angle

The lobe angle of a lens is the entire viewing angle formed by the lens.

Abbe Number

The Abbe number of a transparent or translucent material is a measure of the dispersion (variation of refractive index with wavelength) of the material. An appropriate choice of Abbe number for a lens can help to minimize chromatic aberration.

Security Document

As used herein, the term security document includes all types of documents and tokens of value and identification documents including, but not limited to the following: items of currency such as banknotes and coins, credit cards, cheques, passports, identity cards, securities and share certificates, driver's licences, deeds of title, travel documents such as airline and train tickets, entrance cards and tickets, birth, death and marriage certificates, and academic transcripts.

Transparent Windows and Half Windows

As used herein the term window refers to a transparent or translucent area in the security document compared to the substantially opaque region to which printing is applied. The window may be fully transparent so that it allows the transmission of light substantially unaffected, or it may be partly transparent or translucent partially allowing the transmission of light but without allowing objects to be seen clearly through the window area.

A window area may be formed in a polymeric security document which has at least one layer of transparent polymeric material and one or more opacifying layers applied to at least one side of a transparent polymeric substrate, by omitting least one opacifying layer in the region forming the window area. If opacifying layers are applied to both sides of a transparent substrate a fully transparent window may be formed by omitting the opacifying layers on both sides of the transparent substrate in the window area.

A partly transparent or translucent area, hereinafter referred to as a "half-window", may be formed in a polymeric security document which has opacifying layers on both sides by omitting the opacifying layers on one side only of the security document in the window area so that the "half-window" is not fully transparent, but allows some light to pass through without allowing objects to be viewed clearly through the half-window.

Alternatively, it is possible for the substrates to be formed from an substantially opaque material, such as paper or fibrous material, with an insert of transparent plastics material inserted into a cut-out, or recess in the paper or fibrous substrate to form a transparent window or a translucent half-window area.

Opacifying Layers

One or more opacifying layers may be applied to a transparent substrate to increase the opacity of the security document. An opacifying layer is such that $L_T < L_O$, where $L_O$ is the amount of light incident on the document, and $L_T$ is the amount of light transmitted through the document. An opacifying layer may comprise any one or more of a variety of opacifying coatings. For example, the opacifying coatings may comprise a pigment, such as titanium dioxide, dispersed within a binder or carrier of heat-activated cross-linkable polymeric material. Alternatively, a substrate of transparent plastic material could be sandwiched between opacifying layers of paper or other partially or substantially opaque material to which indicia may be subsequently printed or otherwise applied.

Zero-Order Diffraction Grating

A zero-order diffraction grating is a surface-relief or buried microstructure which produces light in only the zero diffraction order under illumination by light of a given wavelength.

Generally, such zero-order structures have a periodicity which is less than the desired wavelength of incident light. For this reason, zero-order diffraction gratings are sometimes also known as sub-wavelength gratings.

Embossable Radiation Curable Ink

The term embossable radiation curable ink used herein refers to any ink, lacquer or other coating which may be applied to the substrate in a printing process, and which can be embossed while soft to form a relief structure and cured by radiation to fix the embossed relief structure. The curing process does not take place before the radiation curable ink is embossed, but it is possible for the curing process to take place either after embossing or at substantially the same time as the embossing step. The radiation curable ink may be curable by ultraviolet (UV) radiation. Alternatively, the radiation curable ink may be cured by other forms of radiation, such as electron beams or X-rays.

The radiation curable ink may be a transparent or translucent ink formed from a clear resin material. Such a transparent or translucent ink is particularly suitable for printing light-transmissive security elements such as numerical-type DOEs and lens structures.

In at least one disclosed embodiment, the transparent or translucent ink may comprise an acrylic based UV curable clear embossable lacquer or coating.

Such UV curable lacquers can be obtained from various manufacturers, including Kingfisher Ink Limited, product ultraviolet type UVF-203 or similar. Alternatively, the radiation curable embossable coatings may be based on other compounds, e.g., nitro-cellulose.

The radiation curable inks and lacquers used in the disclosed embodiments have been found to be particularly suitable for embossing microstructures, including diffractive structures such as DOEs, diffraction gratings and holograms, and microlenses and lens arrays. However, they may also be embossed with larger relief structures, such as non-diffractive optically variable devices.

The ink may be embossed and cured by ultraviolet (UV) radiation at substantially the same time. In at least one disclosed embodiment, the radiation curable ink is applied and embossed at substantially the same time in a Gravure printing process.

Optionally, in order to be suitable for Gravure printing, the radiation curable ink has a viscosity falling substantially in the range from about 20 to about 175 centipoise, and may be from about 30 to about 150 centipoise. The viscosity may be determined by measuring the time to drain the lacquer from a Zahn Cup #2. A sample which drains in 20 seconds has a viscosity of 30 centipoise, and a sample which drains in 63 seconds has a viscosity of 150 centipoise.

With some polymeric substrates, it may be necessary to apply an intermediate layer to the substrate before the radiation curable ink is applied to improve the adhesion of the embossed structure formed by the ink to the substrate.

The intermediate layer may comprise a primer layer, and the primer layer may include a polyethylene imine. The primer layer may also include a cross-linker, for example a multifunctional isocyanate. Examples of other primers suitable for use in the disclosed embodiments include: hydroxyl terminated polymers; hydroxyl terminated polyester based co-polymers; cross-lined or uncross-linked hydroxylated acrylates; polyurethanes; and UV curing anionic or cationic acrylates. Examples of suitable cross-linkers include: isocyanates; polyaziridines; zirconium complexes; aluminium acetylacetone; melamines; and carbodi-imides.

The type of primer may vary for different substrates and embossed ink structures. Optionally, a primer is selected which does not substantially affect the optical properties of the embossed ink structure.

SUMMARY

Disclosed embodiments provide a security element, including a plurality of focusing elements, a first group of image elements, and a second group of image elements, each image element being located in an object plane to be viewable through a focusing element, and being located a distance from the focusing element such that the focal point width of the focusing element in the object plane is substantially equal to the size of the image element or differs from the size of the image element by a predetermined amount, wherein image elements of the first group are visible in a first range of viewing angles and image elements of the second group are visible in a second range of viewing angles, and wherein a second image formed in the second range of viewing angles is a contrast-inverted version of a first image formed in the first range of viewing angles.

Optionally, the predetermined amount by which the focal point width varies from the size of the image elements is not more than 20% of the size of the image elements.

The present inventors have found that by using first and second images which are contrast-inverted versions of each other, together with a slightly off-focus lens design, a recognisable optically variable effect in the form of a flipping image can be produced despite the presence of some cross-talk. When the first group of image elements is visible it forms a foreground region of the first image. Although some cross-talk from the second group of image elements is visible, the cross-talk is greatly reduced compared to a design using on-focus lenses, because only part of the focal spot overlaps with the image elements of the second group. This reduced cross-talk forms a uniform background for the first image.

Optionally, the image elements are a color other than black. It has been found in some cases that a flipping image effect produced by black image elements can be mimicked by using a metallic ink. The use of colors other than black precludes the use of metallic inks for counterfeiting.

In at least one disclosed embodiment, the first group of image elements is a different color to the second group of image elements. The use of different colors further increases the difficulty to the counterfeiter.

The image elements may have a size distribution or a spatial distribution corresponding to the grey levels or brightness levels of an input monochromatic image. The input image may be a portrait or other image having a large degree of information content.

Optionally, the image elements are printed image elements, for example gravure-printed, offset-printed, screen-printed or flexographically-printed elements. Alternatively, the image elements may be embossed image elements.

BRIEF DESCRIPTION OF THE DRAWINGS

Disclosed embodiments will now be described, by way on non-limiting example only, with reference to the accompanying drawings, in which:

FIGS. 1(a) to 1(d) show a lenticular device of known type;

FIGS. 2(a) to 2(d) show a modified version of the lenticular device of FIGS. 1(a) to 1(d);

DETAILED DESCRIPTION OF THE DISCLOSED EMBODIMENTS

In at least one disclosed embodiment, the focusing elements are on one side of a transparent or translucent substrate. The image elements may be on the opposite side of the transparent or translucent substrate.

The image elements may be line elements, but may be any other suitable shape, for example dots or geometrical shapes.

In at least one disclosed embodiment, the focusing elements are refractive or diffractive part-cylindrical lenses, or zone plates. Alternatively, the focusing elements may be refractive or diffractive part-spherical or polygonal-base micro lenses.

Another disclosed embodiment provides a method of forming a security device, including the steps of providing a transparent or translucent substrate, applying a plurality of focusing elements to a first surface of the substrate, and applying a first group of image elements and a second group of image elements to an image surface of the substrate, each image element being located in an object plane to be viewable through a focusing element, and being located a distance from the focusing element such that the focal point width of the focusing element in the object plane is substantially equal to the size of the image element or differs from the size of the image element by a predetermined amount, whereby image elements of the first group are visible in a first range of viewing angles and image elements of the second group are visible in a second range of viewing angles, and whereby a second image formed in the second range of viewing angles is a contrast-inverted version of a first image formed in the first range of viewing angles.

The focusing elements may be applied by embossing, optionally by embossing in a layer of embossable radiation-curable ink applied to the first surface of the substrate.

Optionally, the image elements are applied by a printing method. Optional methods are gravure-printing, offset-printing, screen-printing or flexographic-printing. The image elements may also be applied by embossing.

Another disclosed embodiment provides a security document, including a security element according to any one of the disclosed embodiments, a security device according to at least one disclosed embodiment, or a security device manufactured according to any of the methods disclosed above. In at least one disclosed embodiment, the security element or security device is located within a window or half-window region of the security document.

Figure 1D:
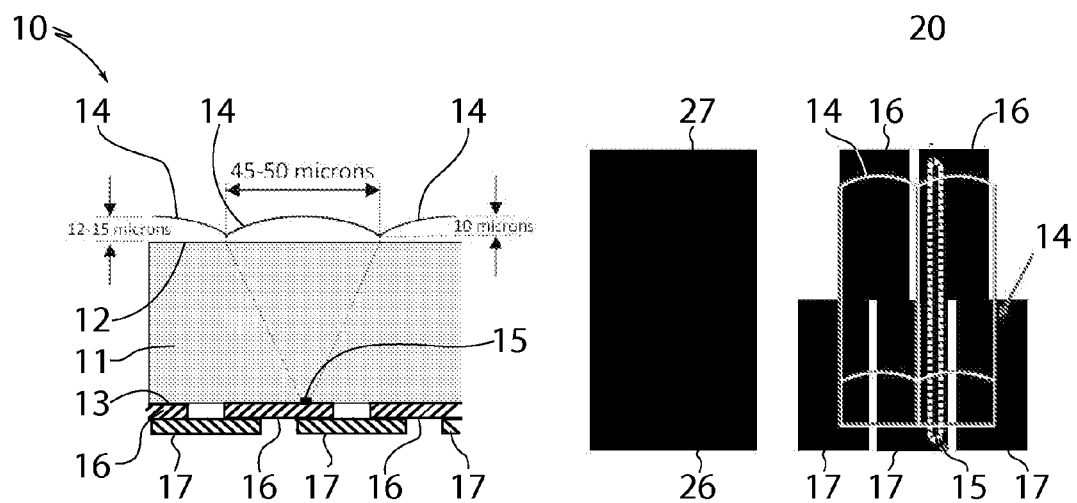
Figure 1D:
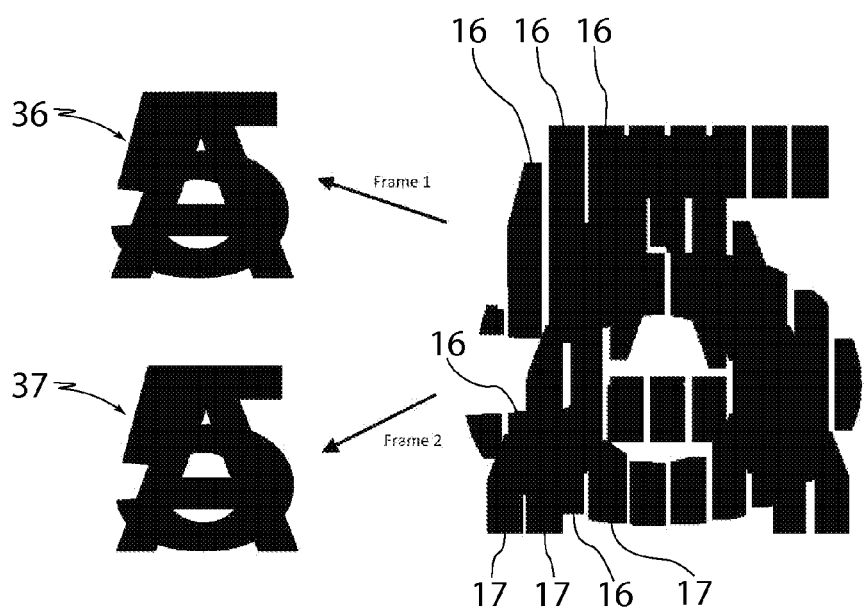

Referring initially to FIG. 1, there is shown part of a lenticular device 10 of known design, having a plurality of focusing elements in the form of part-cylindrical lenses 14. The device 10 includes a substrate 11 having an upper surface 12 and a lower surface 13. The focusing elements 14 are applied to the upper surface 12, and the lower surface 13 is an object plane carrying a first group of image elements 16 and a second group of image elements 17. Image elements 17 are shown slightly offset in the cross-sectional view of FIG. 1(a) for purposes of clarity.

The left-hand edges of neighbouring image elements 16 of the first group are aligned with the left-hand edges of associated focusing elements 14 through which the image elements 16 are to be viewed. The left-hand edges of image elements 17 of the second group are aligned with the optical axes associated of focusing elements 14. Image elements 16 and 17 are in interleaved relationship in the object plane 13 (FIG. 1(d)) to form first and second channels of a flipping image.

Object plane 13 is placed substantially at the focal length of the focusing elements 14. This results in a very narrow region 15 in the object plane over which incoming rays are focused, much narrower than the width of image elements 16, 17.

In FIG. 1(a), the security element substrate 11 has a thickness of approximately 75 microns. In order to keep the total security element thickness to less than 90 microns, the sag height of the lenses 14 is less than 15 microns, and the lens diameter is of the order of 45 to 50 microns. If image elements 16, 17 are applied by gravure printing, their width will be larger than half the lens diameter. This results in a cross-talk region of viewing angles in which both image elements 16 and image elements 17 are visible. In the cross-talk region, for example at viewing angles which view positions 20 of the device (FIG. 1(c)), the image elements 16 and 17 are each spanned by the entire width of focal region 15, resulting in identical apparent brightnesses 26 and 27 (FIG. 1(b)) to the viewer. The ability to distinguish between images 36 (character '5') and 37 (character 'A') is thus completely lost due to the cross-talk between the two groups of image elements 16, 17.

Figure 2D:
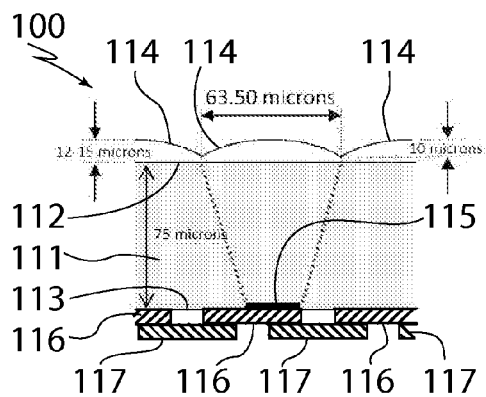
Figure 2D:
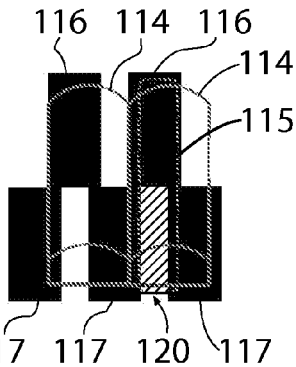
Figure 2D:
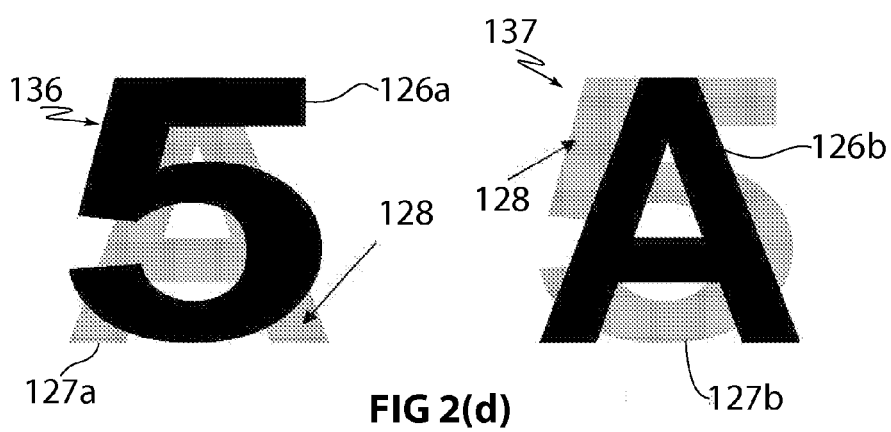

The cross-talk of FIG. 1 can be reduced by using off-focus lens designs such as the one shown in FIG. 2. In FIG. 2(a), a lenticular device 100 includes focusing elements 114 applied to a first surface 112. The focusing elements 114 have a focusing region 115 in the object plane 113 which is almost as wide as the image elements 116 of a first group and image elements 117 of a second group. The focusing region may have a width which is up to 20% smaller or 20% larger than the width of the image elements 116 or 117.

The use of a non-focusing design reduces cross-talk because in a cross-talk region, a reduced portion of the focal region overlaps with an image element which is not intended to be seen by the viewer. For example, in region 120 shown in FIG. 2(c), image elements 116 of the first group should be visible to display the first channel of the flipping image, while image elements 117 of the second group should not be seen. The entire width of the focal region 115 overlaps with image elements 116 at the viewing angle shown in FIG. 2(c), to produce an apparent intensity 126 (FIG. 2(b)). On the other hand, only part of image element 117 overlaps with the focal region 115, so that a reduced intensity 127 is seen by the viewer.

The net impression to the viewer emerging from the viewing angle shown in FIG. 2(d) is a first image 136 comprising a foreground region 126a in the form of the character '5', produced by the first group of image elements 116. Due to the presence of cross-talk 128 from the second group of image elements 117, a shadow 127a of character 'A' is seen in the background. As the device is tilted, character 'A' becomes more prominent, due to a greater proportion of the width of focusing region 115 viewing the image elements 117, and character '5' becomes gradually more muted, until the two characters '5' and 'A' become undistinguishable. On further tilting, the character 'A' dominates and forms the foreground 126b of an image 137, with the cross-talk 128 from image elements 116 of character '5' forming the background 127b.

While the device 100 of FIG. 2 gives an improved result compared to device 10 of FIG. 1, the amount of cross-talk between the two channels 126a, 126b of the flipping image may be unacceptably large for security document applications. It has therefore been found greatly advantageous to select a design in which the two images of the flipping image are contrast-inverted versions of each other, as shown in the disclosed embodiment of FIGS. 3 to 5.

Figure 3:
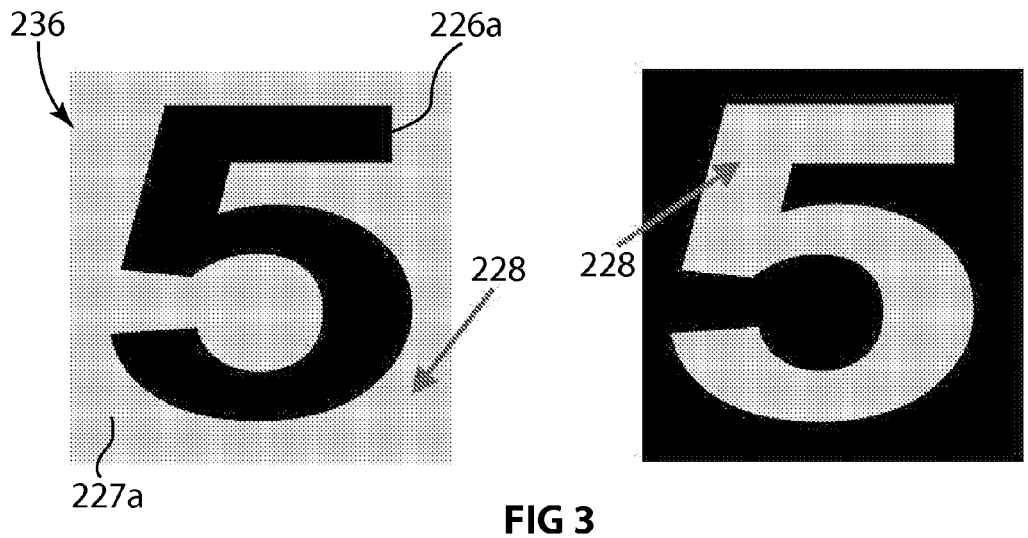
FIG. 3 shows a flipping image effect produced by at least one disclosed embodiment.
Figure 4:
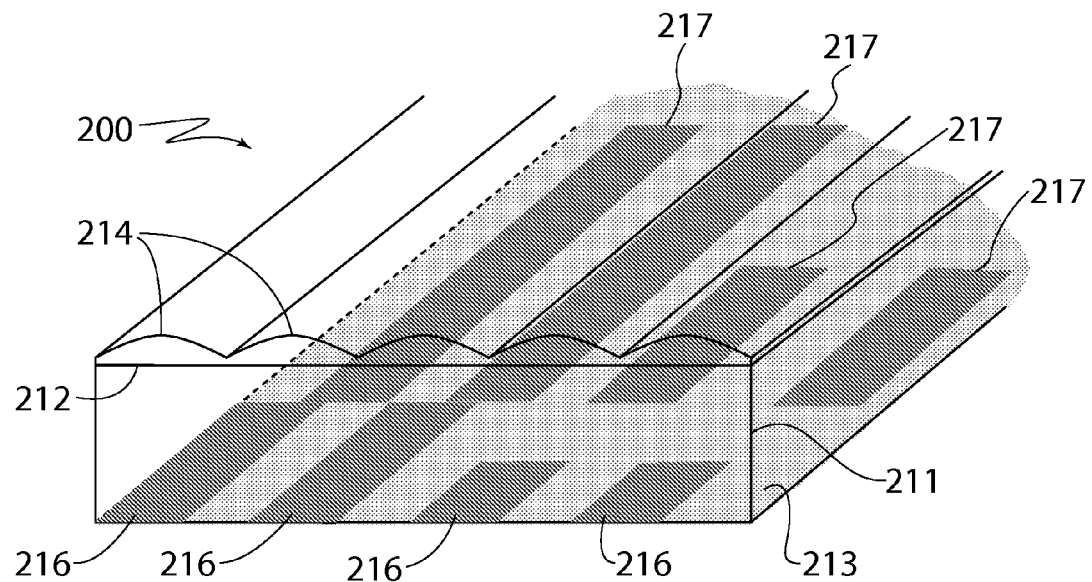
FIG. 4 is a perspective view of part of a security element producing the effect of FIG. 3.
Figure 5:
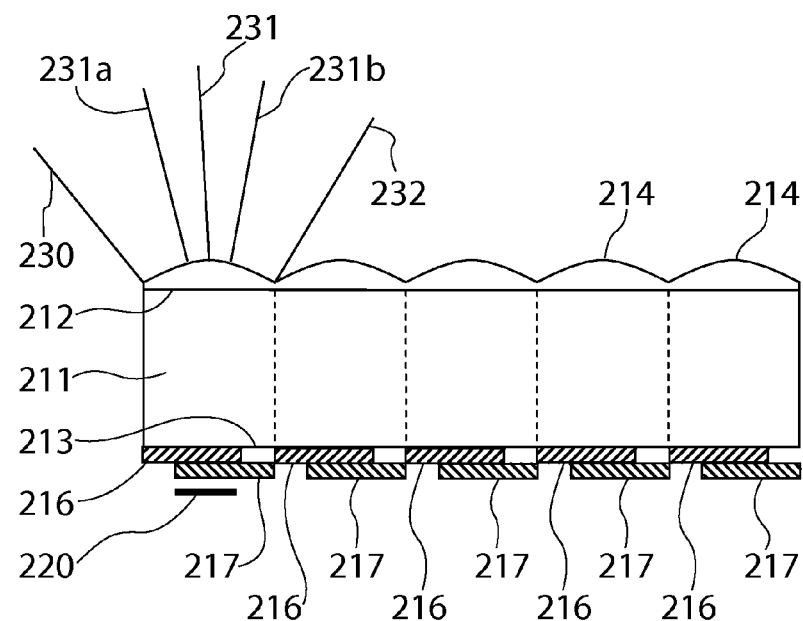
FIG. 5 is a cross-section through the security element of FIG. 4.

Referring to FIGS. 3, 4 and 5, there is shown a perspective view of part of a security element 200 having a substrate 211 with upper surface 212 and lower surface (object plane) 213. A first group of image elements 216 and a second group of image elements 217, in the form of gravure-printed lines, are applied to lower surface 213. The image elements 216, 217 are viewable through associated focusing elements (part-cylindrical lenses) 214 applied to the upper surface 212 of the substrate 211.

In the cross-sectional view of FIG. 5, image elements 217 are slightly offset from lower surface 213 for reasons of clarity. Image elements 217 of the first group are viewable in a first range of viewing angles from direction 230 to direction 231, while image elements 216 of the second group are viewable in a second range of viewing angles from direction 231 to direction 232. There is also a range of viewing angles from direction 231a to 231b, in which the whole of cross-talk region 220 is seen by the viewer.

When the device 200 is viewed from angle 232, a first image 236 is visible, in which the image elements 216 of the first group are brightest and produce the impression of a character '5'. Similarly, when the device 200 is viewed from angle 230, a second image 237 is visible, in which the image elements 217 of the first group are brightest and produce the impression of a contrast-inverted character '5'.

In first image 236, first image elements 216 thus form the foreground region 226a while second image elements 217 form a uniform background region 227a. Conversely, in second image 237, second image elements 217 form the foreground region 226b while first image elements form a uniform background region 227b. In each case, the cross-talk 228 becomes a uniform background to the image 236, 237 which is desired to be projected.

Figure 6:
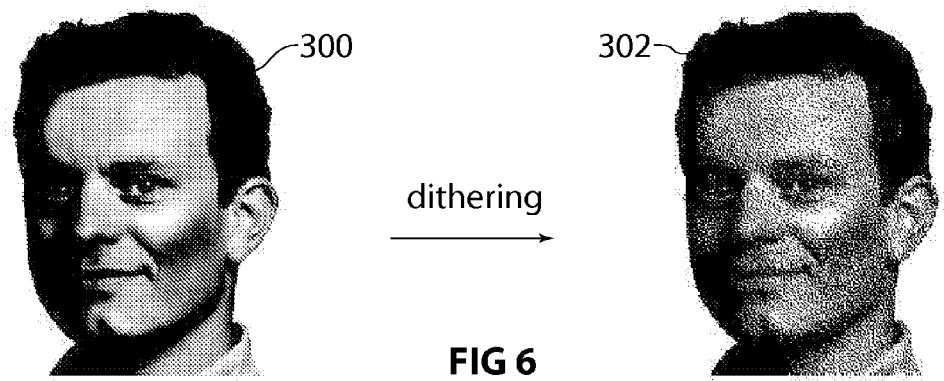
FIGS. 6 and 7 schematically depict a method of producing artwork for another disclosed embodiment.
Figure 7:
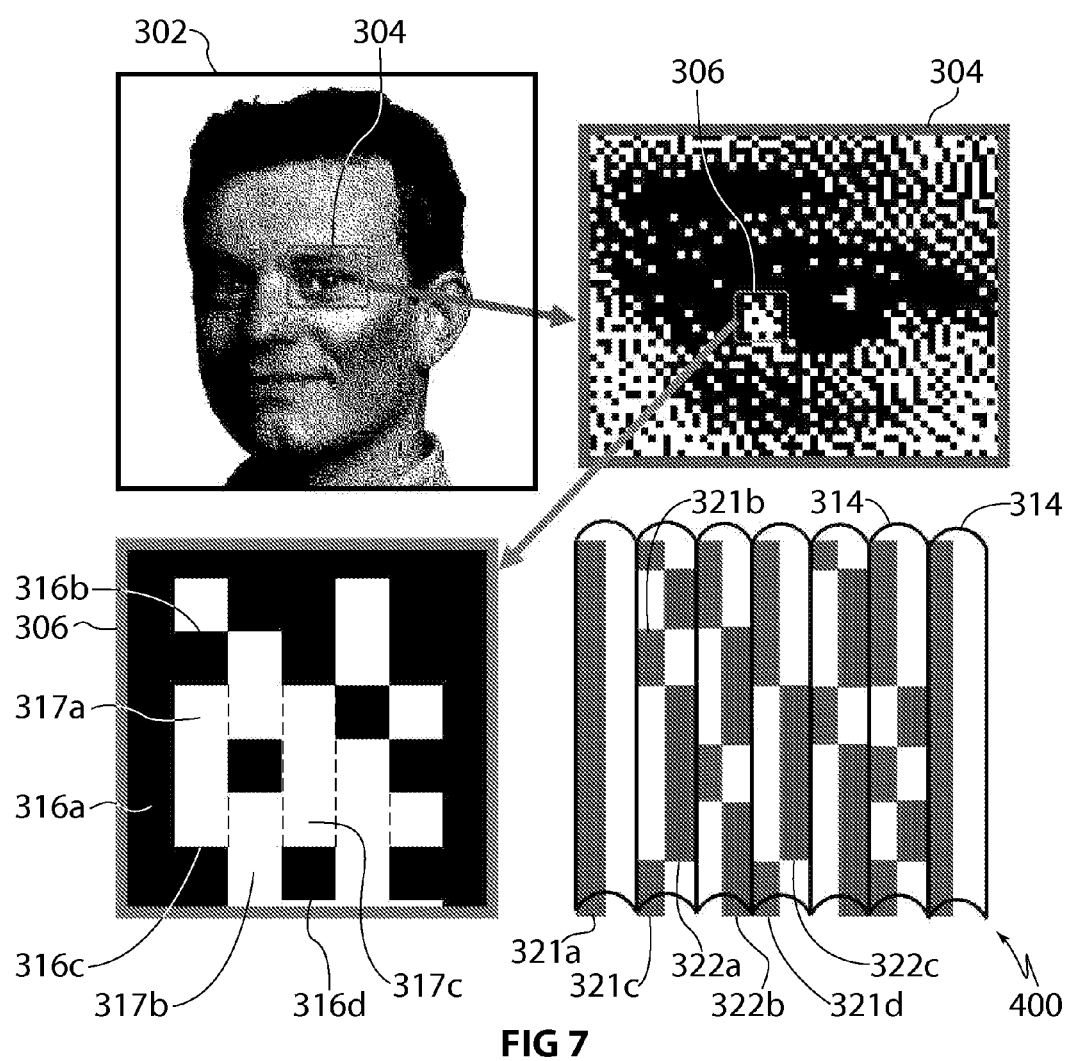
Figure 8:
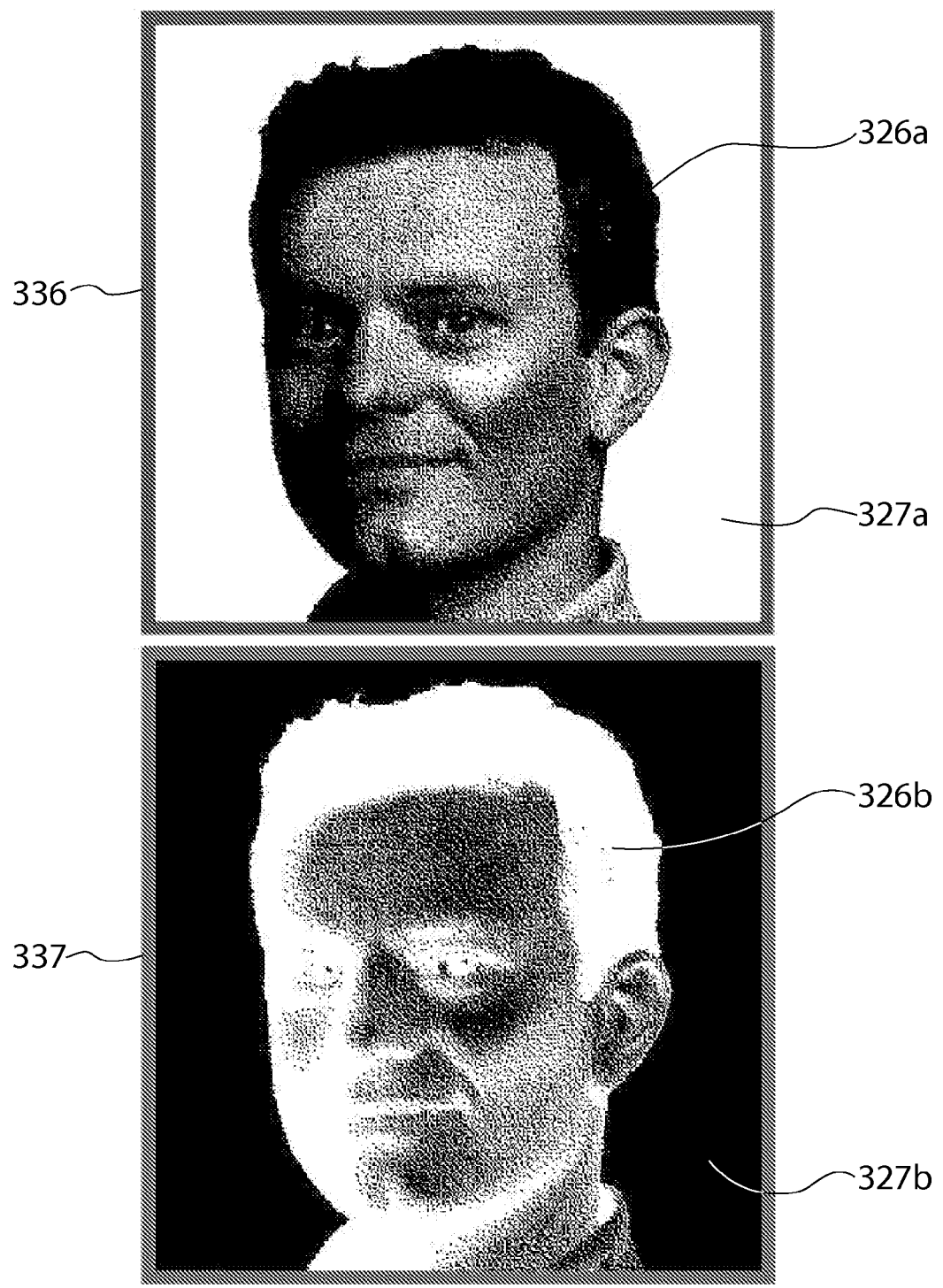
FIG. 8 shows the effect generated by the disclosed embodiment of FIGS. 6 and 7.

Referring now to FIGS. 6 to 8, a method of producing a more complex security element is depicted schematically.

In FIG. 6, a monochromatic input image in the form of a portrait 300 is shown. Portrait 300 is a greyscale bitmap having 256 grey levels. This is then converted to a binary bitmap 302, for example by applying a frequency-modulated dithering, error diffusion, or random or stochastic screening. The result is a two-level (binary) bitmap which appears as a tonal portrait due to the spatial distribution of the black pixels. A region with a higher spatial density of black pixels will tend to appear darker, while a sparser distribution will appear lighter.

FIG. 7 shows a close-up of one region 304 of the bitmap 302, a subregion 306 of which is shown in further close-up. Region 306 includes black pixelated regions 316a, 316b, 316c, 316d, and white pixelated regions 317a, 317b, 317c.

To produce a flipping image with contrast inversion, the black regions are first mapped to a first group of image elements 321a, 321b, 321c and 321d respectively, which are applied to security element 400 as a series of gravure-printed lines with their left-hand edges substantially aligned with left-hand edges of lenses 314. The gravure-printed lines 321a-321d each have a length corresponding to the length of the corresponding black pixelated region 316a-316d.

The white pixelated regions are mapped to a second group of image elements 322a, 322b and 322c respectively, which are applied to security element 400 as a second series of gravure-printed lines with their right-hand edges substantially aligned with right-hand edges of associated lenses 314. Gravure-printed lines 322a-322c each have a length corresponding to the length of the corresponding white pixelated region 317a-317c.

In a first range of viewing angles, a first image 336, substantially reproducing the portrait 300, is seen by a person viewing the device 400 (FIG. 8). This includes foreground region 326a from image elements 321a-321d, and uniform background region 327a due to cross-talk from image elements 322a-322c. As the device 400 is tilted through the first range of viewing angles, the amount of reflected light from background region 327a decreases, until the viewer reaches a second range of viewing angles in which background 327a begins to dominate. In the second range of viewing angles, a second, contrast-inverted image 337 is seen, in which image elements 322a-322c form the foreground 327b, while cross-talk from image elements 321a-321d forms the uniform background 326b.

In a representative example of a method for manufacturing security elements substantially as described above, a layer of embossable radiation curable ink, for example UV-curable ink, is applied to one side of a 75 micron thick biaxially oriented polypropylene (BOPP) film. The UV-curable ink is then embossed with lens structures 214 or 314 and cured to produce a lenticular substrate with a total thickness of approximately 85 to 90 microns.

The surface opposite the lens structures is gravure printed with image elements 216, 217 (FIG. 4 to 6) or 321a-321d, 322a-322c (FIG. 7) of a single color. A color for the image elements is one which will produce sufficient contrast yet is difficult to imitate. Blue, magenta, violet or scarlet are optional colors.

In a representative gravure printing process, a gravure cylinder engraved with the resolution of 10,160 dpi (smallest incremental change in image element position of 2.5 microns) is used. The corresponding gravure engraving file is a binary digital image of the image elements, compensated for the anticipated growth in size of the digital image elements after they are printed.

In order to design lenses of appropriate characteristics for the particular substrate thickness being used, the lenses should have a focal point width which is substantially equal to the image element size, or differs from the image element size by a predetermined amount, optionally no more than 20%. A suitable method is described in PCT application PCT/AU2010/000243, and includes a measurement of the width of the image elements.

Measurement of the characteristics of the gravure-printed lines can be accomplished using a variety of known methods. For example, the average line width can be determined by printing a press calibration template consisting of swatches of lines of a given size and having various densities, where each swatch typically represents a density value from one percent to ninety nine percent. The template is subsequently imaged to film or plate, and printed onto the smooth side of an optical effect substrate. The printed result is then scanned using a densitometer, or similar tool, to determine the printed line width.

Alternatively, the average line width can be measured directly, for example using a microscope fitted with a reticle displaying increments of measurement. In the direct method, a sample of lines can be measured in each tonal value range, recorded, and their sizes averaged.

In order to obtain lens parameters suitable for image elements of a given width and a substrate of given thickness, the following relation between gauge thickness t and lens parameters s (sag height), w (width), R (radius of curvature), P (the conic constant of the lens) and n (refractive index) is optimized:

$$t = s + \frac{h-w}{A}, \qquad (1)$$

with h being the measured half-width of a printed line, and A being given by $$A = -\text{Tan}\left[\alpha(s) - \text{ArcSin}\left(\frac{\text{Sin}(\alpha(s))}{n}\right)\right], \qquad (2)$$

where $$\alpha(s) = \text{ArcTan}\left(\frac{w}{\sqrt{R^2 - P*w^2}}\right). \qquad (3)$$

The thickness t can be optimised with respect to one or more of the lens parameters R, n, P, w and s in the usual way, i.e., by taking the partial derivatives of the expression in Eq (2) with respect to one or more of those parameters and setting the partial derivatives equal to zero. The resulting system of equations can be solved analytically or numerically in order to find the set of lens parameters which gives the optimal lens thickness.

The optimisation may be a constrained optimisation. For example, for banknote substrates, it is desirable to limit t to a range of values between about 85 microns and 100 microns. Constrained optimisation methods are known in the art.

We have found that as long as the focal point size does not exceed the average width of a printed halftone dot by more than 20%, the quality of the image is not compromised. We have also found that simply producing an arbitrary non-focussing design severely degrades the image quality, resulting in an objectionably blurred image. The focal point size may also be slightly smaller than the average width, optionally no more than 20% smaller.

Many variations of the disclosed embodiments are possible without departing from the spirit and scope of the present invention. For example, the security elements described above may be manufactured separately, and then applied to a security document, or may be applied to a security document in situ, for example within a window or half-window region.

The claims defining the invention are as follows:

1. A security element, including:
a plurality of focusing elements,
a first group of image elements, and
a second group of image elements,
each image element being located in an object plane to be viewable through a focusing element, and being located a distance from the focusing element such that the focal point width of the focusing element in the object plane differs from the size of the image element by a predetermined amount, so that the focusing elements are out of focus in the object plane,
wherein the predetermined amount by which the focal point width varies from the size of the image elements is not more than 20% of the size of the image elements,
wherein image elements of the first group are visible in a first range of viewing angles and image elements of the second group are visible in a second range of viewing angles, and
wherein a second image formed in the second range of viewing angles is a contrast-inverted version of a first image formed in the first range of viewing angles, and
wherein cross-talk between the first and second images is reduced by the focusing elements being out of focus in the object plane.

2. The security element of claim 1, wherein the image elements are a colour other than black.

3. The security element of claim 1, wherein the image elements have a size distribution or a spatial distribution corresponding to the grey levels or brightness levels of an input monochromatic image.

4. The security element of claim 1, wherein the image elements are printed image elements.

5. The security element of claim 1, wherein the image elements are embossed image elements.

6. The security element of claim 5, wherein the image elements are diffractive elements or sub-wavelength grating elements.

7. The security element of claim 1, wherein the first group of image elements is a different colour to the second group of image elements.

8. The security element of claim 1, wherein the focusing elements are on one side of a transparent or translucent substrate and the image elements are on the opposite side of the transparent or translucent substrate.

9. The security element of claim 1, wherein the image elements are line elements.

10. The security element of claim 1, wherein the focusing elements are selected from the group comprising:
refractive or diffractive part-cylindrical lenses;
refractive or diffractive part-spherical or polygonal-base microlenses; or
zone plates.

11. The security element according to claim 1, wherein in either the first or second range of viewing angles, cross-talk from one of the second or first image elements forms the background for the image resulting from the other image elements.

12. A method of forming a security device, including the steps providing a transparent or translucent substrate;
applying a plurality of focusing elements to a first surface of the substrate; and
applying a first group of image elements and a second group of image elements to an image surface of the substrate, each image element being located in an object plane to be viewable through a focusing element, and being located a distance from the focusing element such that the focal point width of the focusing element in the object plane differs from the size of the image element by a predetermined amount, so that the focusing elements are out of focus in the object plane,
wherein the predetermined amount by which the focal point width varies from the size of the image elements is not more than 20% of the size of the image elements,
whereby image elements of the first group are visible in a first range of viewing angles and image elements of the second group are visible in a second range of viewing angles, and
whereby a second image formed in the second range of viewing angles is a contrast-inverted version of a first image formed in the first range of viewing angles, and
wherein cross-talk between the first and second images is reduced by the focusing elements being out of focus in the object plane.

13. The method of claim 12, wherein the image elements are a colour other than black.

14. The method of claim 12, wherein the image elements have a size distribution or a spatial distribution corresponding to the grey levels or brightness levels of an input monochromatic image.

15. The method of claim 12, wherein the focusing elements are applied by embossing.

16. The method of claim 15, wherein the focusing elements are embossed in a layer of radiation-curable ink applied to the first surface of the substrate.

17. The method of claim 12, wherein the image elements are applied by a printing method.

18. The method of claim 12, wherein the image elements are applied by embossing.

19. The method according to claim 12, wherein in either the first or second range of viewing angles, cross-talk from one of the second or first image elements forms the background for the image resulting from the other image elements.

20. A security document, including a security element according to claim 1.

21. The security document of claim 20, wherein the security element or security device is located within a window or half-window region of the security document.

22. A security element, including:
a transparent or translucent substrate,
a plurality of focusing elements on one side of said transparent or translucent substrate,
a first group of image elements, and
a second group of image elements, the image elements being on the opposite side of said transparent or translucent substrate from said one side of said transparent or translucent substrate each image element being located in an object plane to be viewable through a focusing element, and being located a distance from the focusing element such that the focal point width of the focusing element in the object plane is substantially equal to the size of the image element or differs from the size of the image element by a predetermined amount, so that the focusing elements are out of focus in the object plane,
wherein the predetermined amount by which the focal point width varies from the size of the image elements is not more than 20% of the size of the image elements,
wherein image elements of the first group are visible in a first range of viewing angles and image elements of the second group are visible in a second range of viewing angles, and wherein a second image formed in the second range of viewing angles is a contrast-inverted version of a first image formed in the first range of viewing angles, and
wherein cross-talk between the first and second images is reduced by the focusing elements being out of focus in the object plane.

* * * * *